(12) United States Patent
Kim et al.

(10) Patent No.: US 11,418,363 B2
(45) Date of Patent: Aug. 16, 2022

(54) APPARATUS AND METHOD FOR DIAGNOSING SLEEP OF CAN FOR VEHICLE (71) Applicants: Hyundai Motor Company, Seoul (KR); Kia Motors Corporation, Seoul (KR)

(72) Inventors: Ji Hyeon Kim, Hwaseong-si (KR); Kwang Hae Ye, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 16/834,304

(22) Filed: Mar. 30, 2020

(65) Prior Publication Data

US 2021/0184890 A1 Jun. 17, 2021

(30) Foreign Application Priority Data

Dec. 17, 2019 (KR) .......................... 10-2019-0169280

(51) Int. Cl.
*H04L 12/40* (2006.01)
*H04L 12/12* (2006.01)
*G07C 5/00* (2006.01)
*G07C 5/08* (2006.01)

(52) U.S. Cl.
CPC ........ *H04L 12/40039* (2013.01); *G07C 5/008* (2013.01); *G07C 5/0808* (2013.01); *H04L 12/12* (2013.01); *H04L 12/40013* (2013.01); *H04L 2012/40215* (2013.01); *H04L 2012/40273* (2013.01)

(58) Field of Classification Search
CPC ............... H04L 12/40039; H04L 12/12; H04L 12/40013; H04L 2012/40215; H04L 2012/40273; H04L 12/40; H04L 12/40006; H04L 12/40045; G07C 5/008; G07C 5/0808; G07C 2205/02; Y02D 30/50; B60R 16/0232
USPC .................... 701/31.4, 32.8, 33.2, 29.1, 31.6
See application file for complete search history.

(56) References Cited

U.S. PATENT DOCUMENTS

| 5,757,773 A * | 5/1998 | Tsuji ....................... H04L 12/12 340/3.1 |
| 8,044,782 B2 * | 10/2011 | Saban .................... B60N 2/002 340/439 |
| 10,107,888 B1 * | 10/2018 | Choi ...................... G01S 5/0027 |
| 11,338,074 B2 * | 5/2022 | Minkus .................. G16H 20/40 |

(Continued)

FOREIGN PATENT DOCUMENTS

| KR | 101439050 B1 | 10/2014 |
| KR | 101558387 B1 | 10/2015 |

*Primary Examiner* — Faisal M Zaman
(74) *Attorney, Agent, or Firm* — Slater Matsil, LLP (57) ABSTRACT

A controller area network (CAN) sleep diagnosis apparatus can be used with a vehicle. A CAN signal detector is configured to detect a CAN signal from a CAN that connects a plurality of controllers and a CAN sleep diagnosis unit is configured to diagnose whether the CAN enters a sleep state. A memory unit is configured to determine whether to store data received from the CAN signal detector and the CAN sleep diagnosis unit depending on whether the CAN enters the sleep state and to store the data in a memory. A diagnosis unit is configured to check the data stored in the memory and to diagnose a non-sleep state of the CAN.

20 Claims, 6 Drawing Sheets

(56) References Cited

U.S. PATENT DOCUMENTS

| | | | | |
|---|---|---|---|---|
| 2002/0006139 A1* | 1/2002 | Kikkawa | H04L 12/12 | 370/502 |
| 2002/0012325 A1* | 1/2002 | Kikkawa | H04L 41/0677 | 370/311 |
| 2008/0300732 A1* | 12/2008 | Luz | H04L 12/4135 | 701/1 |
| 2013/0072350 A1* | 3/2013 | Ueno | F16H 63/48 | 477/111 |
| 2014/0350772 A1* | 11/2014 | Saito | G07C 5/0808 | 701/29.1 |
| 2017/0124871 A1* | 5/2017 | Sunadham | H04Q 9/00 | |
| 2019/0210545 A1* | 7/2019 | Sangameswaran | B60R 16/033 | |
| 2019/0351791 A1* | 11/2019 | Saucier, Jr. | B60N 2/067 | |
| 2019/0379218 A1* | 12/2019 | Varughese | H02J 7/0029 | |
| 2020/0125355 A1* | 4/2020 | Aust | G06F 8/65 | |

\* cited by examiner

| OPERATION SIGNAL PRIOR TO PARK | | | OPERATION SIGNAL DURING PARK | | | OPERATION SIGNAL AFTER PARK | | |
|---|---|---|---|---|---|---|---|---|
| # | CAN SIGNAL TITLE | CAN SIGNAL CONTENT | # | CAN SIGNAL TITLE | CAN SIGNAL CONTENT | # | CAN SIGNAL TITLE | CAN SIGNAL CONTENT |
| 1 | Door_Lock_State | WHETHER DOOR IS LOCKED | 7 | RR_Camera_state | WHETHER REAR CAMERA IS TURNED ON | 10 | SMK_LOCK | SMART KEY DOOR LOCK SIGNAL |
| 2 | Door_Close_State | WHETHER DOOR IS CLOSED | 8 | EFB_State | WHETHER PARKING BRAKE IS TURNED ON | 11 | SMK_UNLOCK | SMART KEY DOOR UNLOCK SIGNAL |
| 3 | Head_Lamp_State | WHETHER HEAD LAMP IS TURNED ON | 9 | AUTO_Park_state | WHETHER AUTONOMOUS PARK SYSTEM IS TURNED ON | 12 | SMK_TRUNK | SMART KEY TRUNK OPEN SIGNAL |
| 4 | Wiper_State | WHETHER WIPER IS TURNED ON | | | | 13 | IGN_STATE | WHETHER IGN AND ACC ON |
| 5 | Hazard_State | WHETHER EMERGENCY LIGHT IS TURNED ON | | | | | ... | |
| 6 | Sunroof_State | WHETHER SUN ROOF IS OPEN | | | | N | SMK_WARNING | SMART KEY WARNING SOUND COMMAND SIGNAL |

FIG. 3

| CONTENT | CAN SLEEP SIGNAL WAVEFORM | CONTENT |
|---|---|---|
| TYPE 1 | WHETHER CAN ENTERS SLEEP<br>ALIVE ──────────<br>SLEEP<br>VEHICLE POWER OFF → ELAPSED TIME AFTER POWER IS OFF (MINUTE) | WHETHER CAN IS MAINTAINED TO BE ALIVE AFTER VEHICLE IS POWERED OFF |
| TYPE 2 | WHETHER CAN ENTERS SLEEP<br>제어기 Wake-up<br>ALIVE ────┐    ┌──<br>SLEEP     └────┘<br>VEHICLE POWER OFF → ELAPSED TIME AFTER POWER IS OFF (MINUTE) | WAKE-UP CAN WHEN SPECIFIC TIME ELAPSES AFTER CAN ENTERS SLEEP AFTER POWER IS TURNED OFF |
| 유형3 | WHETHER CAN ENTERS SLEEP<br>ALIVE ⊓⊓⊓⊓⊓⊓<br>SLEEP<br>VEHICLE POWER OFF → ELAPSED TIME AFTER POWER IS OFF (MINUTE) | CAN AFTER VEHICLE IS POWERED OFF REPEATEDLY SLEEP ↔ ALIVE |

FIG. 4

| STORING TIME POINT | STORED CONTENT (EXAMPLE) | | |
|---|---|---|---|
| | TIMER($T_{alive}$) | CAN SIGNAL | CONTROLLER THAT DOES NOT ENTER SLEEP |
| $T_{alive} == T_{off}$ | $T_{off}$ | Door Close Door Lock | CLUSTER |
| SMART KEY Door LOCK | 3min | Door Close Door Lock | - |
| Door CLOSE | 2min | Door Close Wiper ON | - |
| Door OPEN | 1min | Door OPEN Wiper ON | - |
| IGN ON → OFF | 0min | Door Close Wiper ON | - |
| CGW Wake-up | 0min | IGN OFF Door_Close | - |

FIG. 5

| VEHICLE STATE AFTER KEY OFF | | | |
|---|---|---|---|
| TIME POINT | VEHICLE STATE | | |
| WAKE-UP CGW CONTROLLER | Door CLOSE, Door LOCK, Key OFF | | |
| Key ON → OFF | Door CLOSE, Door LOCK, Hazard lamp ON, T/signal lamp ON | | |
| OPERATION SINGLE AFTER KEY OFF | | | |
| TIME POINT (AFTER KEY OFF) | OPERATION SIGNAL | TIME POINT (AFTER KEY OFF) | OPERATION SIGNAL |
| ONE MINUTE ELAPSES | Hazard Lamp OFF | THREE MINUTES ELAPSE | SMART KEY : Door LOCK |
| ONE MINUTE ELAPSES | Door OPEN | - | - |
| TWO MINUTES ELAPSE | Door CLOSE | - | - |
| $T_{off}$ ELAPSES AFTER KEY OFF | | | |
| CONTROLLER THAT DOES NOT ENTER SLEEP | IGPM | REDUCE CHARGE RATE OF BATTERY | 90% → 40% |

APPARATUS AND METHOD FOR DIAGNOSING SLEEP OF CAN FOR VEHICLE

CROSS-REFERENCE TO RELATED APPLICATIONS

This application claims priority to Korean Patent Application No. 10-2019-0169280, filed on Dec. 17, 2019, which application is hereby incorporated herein by reference.

TECHNICAL FIELD

The present disclosure relates to an apparatus and method for diagnosing sleep of a controller area network (CAN) for a vehicle.

BACKGROUND

In general, numerous controllers for performing various control functions have been applied to a vehicle.

Today, as electronic and communication technologies have been developed and many functions have been required for vehicles, the number of electronic controllers has increased, and the amount of transmitted and received data has increased.

Thus, as logic for entry into a sleep mode in each control becomes complicated, entry into the sleep mode frequently fails due to an error in the logic for entry into the sleep mode.

In the case of a vehicle, due to controller area network (CAN) characteristics, when some controllers do not enter sleep, other controllers also do not enter sleep.

In the case of the vehicle, the amplitude of dark current is increased, and thus, battery may be discharged within a short time after the vehicle is parked.

It is difficult to predict a condition in which an error occurs in logic for entry into the sleep mode.

For example, an error whereby a vehicle does not enter a sleep mode may occur depending on a type and timing of a signal, and for example, signal B is transmitted after a specific time elapses from a time point of transmitting signal A or signals A and B are simultaneously transmitted.

It is difficult to pre-diagnose such a type of error due to conditions in numerous cases.

Accordingly, in the future, there is a need to develop an apparatus for diagnosing sleep of a CAN for a vehicle for previously overcoming non-sleep state of the CAN in a vehicle development stage by monitoring a CAN signal to diagnose the problem in terms of non-entry into sleep and transmitting a list of controllers that do not enter sleep and a history of transmission of the CAN signal at a corresponding time point to diagnosis equipment.

SUMMARY

The present disclosure relates to a controller area network (CAN) sleep diagnosis apparatus. Particular embodiments relate to a CAN sleep diagnosis apparatus for a vehicle and a CAN sleep diagnosis method thereof for diagnosing and analyzing non-sleep state of a CAN after the vehicle is parked.

Embodiments of the present disclosure are directed to an apparatus and method for diagnosing sleep of a controller area network (CAN) for a vehicle for previously overcoming non-sleep state of the CAN in a vehicle development stage by monitoring a CAN signal to diagnose the problem in terms of non-entry into sleep and transmitting a list of controllers that do not enter sleep and a history of transmitting the CAN signal at a corresponding time point to diagnosis equipment.

The technical problems solved by the embodiments are not limited to the above technical problems and other technical problems which are not described herein will become apparent to those skilled in the art from the following description.

In one embodiment, a controller area network (CAN) sleep diagnosis apparatus for a vehicle includes a CAN signal detector configured to detect a CAN signal from a CAN that connects a plurality of controllers. A CAN sleep diagnosis unit is configured to diagnose whether the CAN enters sleep and a memory storing determiner is configured to determine whether to store data received from the CAN signal detector and the CAN sleep diagnosis unit depending on whether the CAN enters sleep and to store the data in a memory. A diagnosis unit is configured to check the data stored in the memory and to diagnose non-sleep state of the CAN.

In another aspect of the present disclosure, a controller area network (CAN) sleep diagnosis method of a CAN sleep diagnosis apparatus for a vehicle includes detecting a CAN signal from a CAN that connects a plurality of controllers, diagnosing whether the CAN enters sleep, determining whether to store data corresponding to the CAN signal depending on whether the CAN enters sleep and storing the data in a memory, and checking the data stored in the memory and diagnosing non-sleep state of the CAN.

In another aspect of the present disclosure, a computer-readable recording medium having recorded thereon a program for executing the CAN sleep diagnosis method of a CAN sleep diagnosis apparatus for a vehicle performs procedures provided in the CAN sleep diagnosis method of a CAN sleep diagnosis apparatus for the vehicle.

In another aspect of the present disclosure, a vehicle includes a plurality of controllers, and a controller area network (CAN) sleep diagnosis apparatus configured to diagnose non-sleep state of the CAN by monitoring a CAN signal from a CAN that connects the controllers, wherein the CAN sleep diagnosis apparatus includes a CAN signal detector configured to detect a CAN signal from a CAN that connects the plurality of controllers, a CAN sleep diagnosis unit configured to diagnose whether the CAN enters sleep, a memory storing determiner configured to determine whether to store data received from the CAN signal detector and the CAN sleep diagnosis unit depending on whether the CAN enters sleep and to store the data in a memory, and a diagnosis unit configured to check the data stored in the memory and to diagnose non-sleep state of the CAN.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, an apparatus and method for diagnosing sleep of a controller area network (CAN) for a vehicle applicable to embodiments of the present disclosure will be described in detail with reference to FIGS. 1 to 7.

Figure 1:
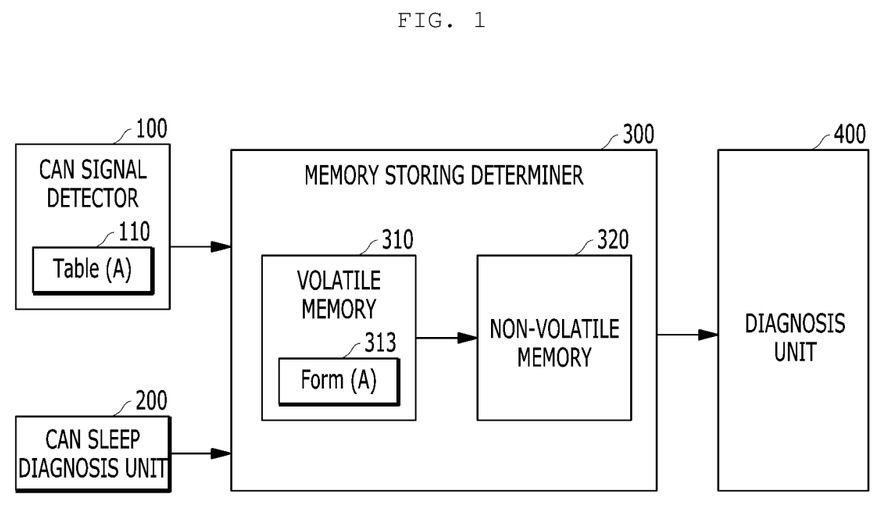
FIG. 1 is a block diagram for explaining an apparatus for diagnosing sleep of a controller area network (CAN) for a vehicle according to an embodiment of the present disclosure.

FIG. 1 is a block diagram for explaining an apparatus for diagnosing sleep of a CAN for a vehicle according to an embodiment of the present disclosure.

As shown in FIG. 1, the apparatus for diagnosing sleep of a CAN for a vehicle according to the present disclosure may include a CAN signal detector 100, a CAN sleep diagnosis unit 200, a memory storing determiner 300, and a diagnosis unit 400.

Here, the CAN signal detector 100 may detect a CAN signal from a CAN that connects a plurality of controllers.

The CAN signal detector 100 may also detect a CAN signal that is changed by manipulation of a driver.

The CAN signal detector 100 may detect the CAN signal and may generate a monitoring table no including a list of N CAN signals.

Here, when generating the monitoring table no, the CAN signal detector 100 may classify the detected CAN signal into an operation signal prior to park, an operation signal during park, and an operation signal after park to generate the monitoring table, but the present disclosure is not limited thereto.

For example, the monitoring table no may include a title and content of the detected CAN signal.

According to the present disclosure, the monitoring table may be configured based on signals that are frequently manipulated by a driver at a time point when a vehicle is parked, and the signals may be classified into an operation signal prior to park, an operation signal during park, and an operation signal after park.

As such, the corresponding signals may be monitored in order to comprehensively diagnose a condition in which non-sleep state of the CAN occurs in a general park condition.

As necessary, when generating the monitoring table no, the CAN signal detector 100 may generate the monitoring table 110 that is changed depending on an environment of a vehicle.

For example, in the case of a vehicle including a mood lamp controller or a smartphone wireless charge controller, a monitoring table including a related signal may also be generated.

Then, the CAN sleep diagnosis unit 200 may diagnose whether a CAN enters sleep.

Here, during diagnosis of whether the CAN enters sleep, the CAN sleep diagnosis unit 200 may diagnose the CAN to enter sleep when the CAN sleeps before a time Talive in which the CAN is maintained to be alive becomes greater than a predetermined time Toff after a vehicle is turned off.

During diagnosis of whether the CAN enters sleep, the CAN sleep diagnosis unit 200 may diagnose that non-sleep state of the CAN occurs when the CAN is maintained to be alive after the time Talive in which the CAN is maintained to be alive becomes greater than the predetermined time Toff after the vehicle is turned off.

During diagnosis of whether a CAN enters sleep, if a vehicle is turned off or a CAN controller is waken up and the vehicle is turned off, the CAN sleep diagnosis unit 200 may accumulate and measure a total alive maintenance time of the CAN until driving a timer to convert vehicle power into an on-state from an off-state, and may reset the timer when vehicle power is converted into an on-state from an off-state.

Here, immediately after vehicle power is converted into an off-state from an on-state or when a CAN controller (e.g., central gateway (CGW) controller) is waken-up and the vehicle is turned off, the CAN sleep diagnosis unit 200 may drive the time from o as an initial value while the CAN is maintained to be alive.

The CAN sleep diagnosis unit 200 may transmit a measurement value of the timer to the memory storing determiner 300 to store the measurement value of the timer in a memory of the memory storing determiner 300 in real time, may maintain the measurement value of the timer even after the CAN enters sleep, and may initialize the timer when vehicle power is converted into an on-state from an off-state.

That is, during diagnosis of whether the CAN enters sleep, when the vehicle is turned off or the CAN controller is waken-up and the vehicle is turned off, the CAN sleep diagnosis unit 200 may accumulate and measure a total alive maintenance time of the CAN until driving a timer to convert into an on-state from an off-state of the vehicle, and may reset the timer when vehicle power is converted into an on-state from an off-state.

Then, when diagnosing whether the CAN enters sleep, the CAN sleep diagnosis unit 200 may diagnose that non-sleep state of the CAN occurs when an alive time of the CAN is greater than a first predetermined time after vehicle power is converted into an off-state from an on-state.

Here, the CAN sleep diagnosis unit 200 may set a time greater than the longest time of time consumptions of wireless update through over the air update (OTA) of all controllers installed in a vehicle as a first predetermined time.

Depending on the cases, in the case of a vehicle to which an OTA function is not applied, the CAN sleep diagnosis unit 200 may also set a time greater than the longest time of a time consumption of entry into a sleep mode after a sleep condition of each controller installed in the vehicle is satisfied and a time for which the CAN is maintained to be alive due to a function of a controller while the vehicle is parked, as a first predetermined time.

Then, when diagnosing whether the CAN enters sleep, the CAN sleep diagnosis unit 200 may diagnose that non-sleep state of the CAN occurs when a network management (NM) message value is alive at a time point at which an alive time of the CAN is greater than a predetermined time after vehicle power is converted into an off-state from an on-state.

Here, the CAN sleep diagnosis unit 200 may determine whether each controller sleeps through a network management (NM) message value or may determine whether each controller sleeps by comparing a CAN identifier (ID) of a CAN message transmitted from each controller with data stored in a CAN database of a vehicle manufacturer.

When diagnosing whether a CAN enters sleep, if the CAN enters sleep and then is waken-up or repeatedly performs wake-up and sleep after vehicle power is converted into an off-state from an on-state, the CAN sleep diagnosis unit 200 may diagnose that non-sleep state of the CAN occurs at a time point at which a total alive maintenance time of the CAN is greater than a second predetermined time while a value of a wake-up counter is equal to or greater than a specific number.

Here, the wake-up counter may be started from o as an initial value, may increase a count one by one when the CAN is waken-up after sleeping, and may be initialized with o when vehicle power is converted into an on-state from an off-state.

Then, the memory storing determiner 300 may determine whether data received from the CAN signal detector 100 and the CAN sleep diagnosis unit 200 is stored depending on whether the CAN enters sleep and may store the data in a memory.

Here, the memory storing determiner 300 may include a first memory 310 for storing data received from the CAN signal detector and the CAN sleep diagnosis unit, and a second memory 320 for storing data corresponding to the CAN to be diagnosed to correspond to non-entry into sleep.

The memory storing determiner 300 may further include a determiner for storing first data in the first memory 310 when receiving the first data from the CAN signal detector 100, receiving second data corresponding to a CAN diagnosed to correspond to non-entry into sleep when the CAN sleep diagnosis unit 200 diagnoses non-entry into sleep of the CAN and storing the second data in the first memory 310, and copying the first and second data stored in the first memory 310 to the second memory 320.

For example, the first memory 310 may be a volatile memory, and the second memory 320 may be a non-volatile memory.

The first data may include a current value and a time measurement value of an initial CAN signal received from the CAN signal detector, and when the initial CAN signal is changed, the first data may include the current value and the timer measurement value of the changed CAN signal, and in this regard, when the CAN sleep diagnosis unit 200 diagnoses non-entry into sleep of the CAN, the first data may include the current value and the timer measurement value of the CAN signal corresponding to the CAN diagnosed to correspond to non-entry into sleep and a list of controllers that do not enter sleep.

Here, the first data may be stored as a stack structure in the form of first in last out (FILO), but the present disclosure is not limited thereto.

The second data may include a current value and a time measurement value of a CAN signal corresponding to a CAN network that does not enter sleep, copied from the first memory 310, and a list of controllers that do not enter sleep.

The memory storing determiner 300 may store the current value and the timer measurement value of an initial CAN signal received from the CAN signal detector in the first memory 310, and in this regard, when the initial CAN signal is changed, the current value and the timer measurement value of the changed CAN signal may be stored in the first memory 310, and when diagnosing non-entry into sleep of the CAN, the CAN sleep diagnosis unit 200 may store the current value and the timer measurement value of the CAN signal corresponding to the CAN network diagnosed to correspond to non-entry into sleep and a list of controllers that do not enter sleep in the first memory 310 and may copy the whole data stored in the first memory 310 to the second memory 320.

Here, when the diagnosis unit 400 is in communication linkage, the memory storing determiner 300 may provide the second data stored in the second memory 320 to the diagnosis unit 400.

When a number of times of ignition-on reach a predetermined value, the memory storing determiner 300 may also deactivate the whole logic according to the present disclosure.

This is because it is required to prevent a product from being operated in a customer use condition after the product is mass-produced.

The memory storing determiner 300 may be a CAN controller including a central gateway (CGW) controller, but the present disclosure is not limited thereto.

For example, according to the present disclosure, a controller using a CAN may be used, and in order to comprehensively diagnose non-sleep state of the CAN, a CAN controller such as a CGW controller may be used.

The diagnosis unit 400 may check data stored in a memory of the memory storing determiner 300 and may diagnose non-sleep state of the CAN.

Here, the diagnosis unit 400 may check a history of transmission of a CAN signal corresponding to a CAN that does not enter sleep and a list of controllers that do not enter sleep, stored in the memory of the memory storing determiner 300, and may track a controller having a problem and a condition in which the problem occurs to analyze the reason for the problem.

As such, according to the present disclosure, non-sleep state of the CAN in a vehicle development stage may be previously overcome by monitoring a CAN signal to diagnose the problem in terms of non-entry into sleep and transmitting a list of controllers that do not enter sleep and a history of transmission of the CAN signal at a corresponding time point to diagnosis equipment.

That is, according to the present disclosure, in the vehicle development stage, occurrence of non-sleep state of the CAN may be diagnosed and the reason therefor may be analyzed by monitoring whether a CAN does not enter sleep and transmitting a list of controllers that do not enter sleep and a history of manipulation of a vehicle at a corresponding time point to diagnosis equipment when the problem occurs.

The present disclosure may propose a further advanced CAN network sleep condition to comprehensively diagnose non-sleep state of the CAN in a general condition in which a vehicle is used, in which case a forced sleep function is not used, thereby ensuring security and stability and simultaneously achieving a previous resolution for pre-diagnosing non-sleep state of the CAN but not a later resolution after the problem occurs.

Thus, according to the present disclosure, a list of controllers at a time point at which non-sleep state of the CAN occurs and a history of manipulation of a vehicle may be checked, and the problem in terms of non-entry into sleep may be diagnosed and the reason for the problem may be analyzed in a vehicle development stage.

According to the present disclosure, in the future, the effect achieved through the present disclosure may be further enhanced in consideration of the fact that related cases increasingly occur along with development of technologies of controllers.

Figure 2:
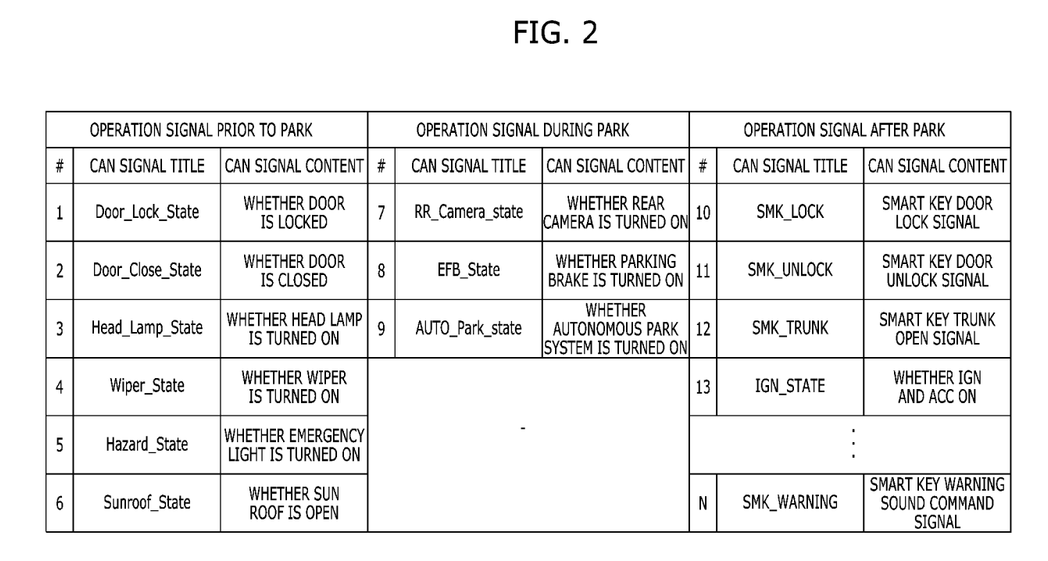
FIG. 2 is a diagram for explaining a monitoring table of a CAN signal detector.

FIG. 2 is a diagram for explaining a monitoring table of a CAN signal detector.

As shown in FIG. 2, the CAN signal detector according to the present disclosure may detect a CAN signal and may generate a monitoring table including a list including N CAN signals.

That is, according to the present disclosure, the monitoring table may be configured based on signals that are frequently manipulated by a driver at a time point when a vehicle is parked, and the signals may be classified into an operation signal prior to park, an operation signal during park, and an operation signal after park.

As such, the corresponding signals may be monitored in order to comprehensively diagnose a condition in which non-sleep state of a CAN occurs in a general park condition.

For example, the monitoring table may include a title and content of the detected CAN signal.

Depending on the cases, the monitoring table may be changed depending on an environment of the vehicle.

For example, in the case of a vehicle including a mood lamp controller or a smartphone wireless charge controller, a monitoring table including a related signal may also be generated.

Figure 3:
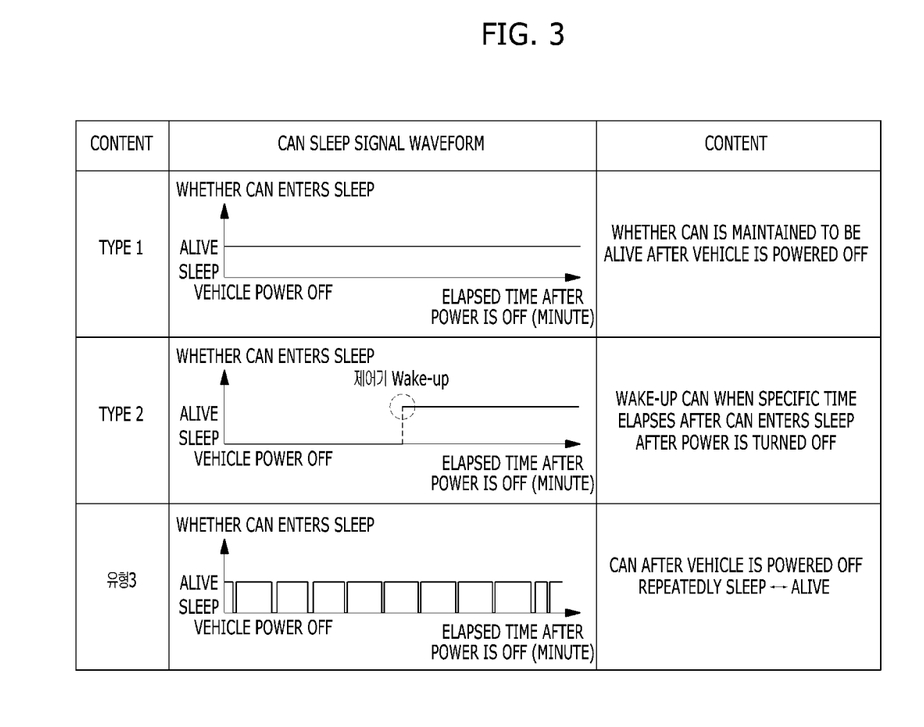
FIG. 3 is a diagram for explaining a method of diagnosing non-entry into sleep of a CAN sleep diagnosis unit.

FIG. 3 is a diagram for explaining a method of diagnosing non-entry into sleep of a CAN sleep diagnosis unit.

As shown in FIG. 3, the CAN sleep diagnosis unit according to the present disclosure may have various types of diagnosing whether a CAN enters sleep.

Like in Type 1, the CAN sleep diagnosis unit may diagnose that non-sleep state of a CAN occurs when the CAN is continuously maintained to be alive after vehicle power is converted into an off-state from an on-state and then an alive time of the CAN is greater than a first predetermined time.

Like in Types 2 and 3, the CAN sleep diagnosis unit may also diagnose that non-sleep state of a CAN occurs at a time point at which a total alive maintenance time of the CAN network is greater than a second predetermined time while a value of a wake-up counter is equal to or greater than a specific number when the CAN enters sleep and then is waken-up or repeatedly performs wake-up and sleep after vehicle power is converted into an off-state from an on-state.

Here, the wake-up counter may be started using o as an initial value, may increase a count one by one when the CAN is waken-up after sleeping, and may be initialized with o when vehicle power is converted into an on-state from an off-state.

The specific number of the wake-up counter may also be set to an appropriate number by a manufacturer.

Here, the second predetermined time may also be set to an appropriate number depending on the characteristics of CAN controllers in a vehicle by the manufacturer.

For example, the second predetermined time may also be set to a multiple of the first predetermined time.

Types 2 and 3 of FIG. 3 may be differentiated by a wake-up counter, in which case the second predetermined time may be differently set depending on each type.

When a vehicle is turned off or a CAN controller is waken up and the vehicle is turned off, the CAN sleep diagnosis unit may accumulate and measure a total alive maintenance time of the CAN until driving a timer to convert into an on-state from an off-state of the vehicle, and may reset the timer when vehicle power is converted into an on-state from an off-state.

The measurement value of the timer may be stored in the second memory that is a non-volatile memory of the memory storing determiner.

Immediately after vehicle power is converted into an off-state from an on-state or when a central gateway (CGW) controller is waken-up and the vehicle is turned off, the CAN sleep diagnosis unit may drive the time from o as an initial value while the CAN is maintained to be alive.

The CAN sleep diagnosis unit may transmit a measurement value of the timer to the memory storing determiner to store the measurement value of the timer in a non-volatile memory of the memory storing determiner in real time, may maintain the measurement value of the timer even after the CAN enters sleep, and may initialize the timer when vehicle power is converted into an on-state from an off-state.

Figure 4:
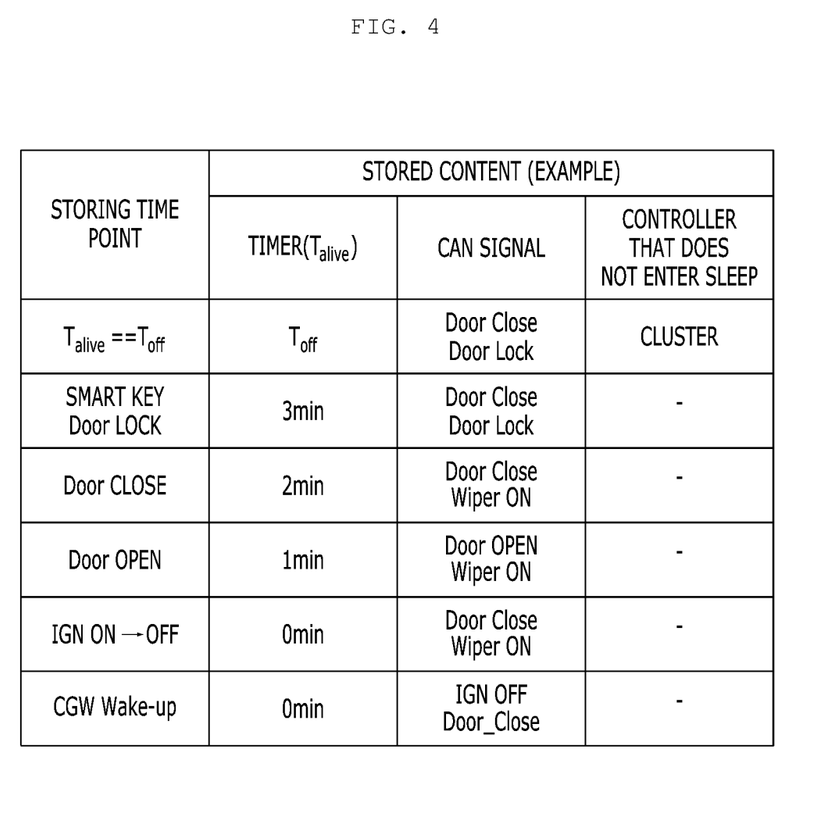
FIG. 4 is a diagram for explaining a memory storing history of a memory storing determiner.

FIG. 4 is a diagram for explaining a memory storing history of a memory storing determiner.

As shown in FIG. 4, the memory storing determiner according to the present disclosure may store a current value and a time measurement value of an initial CAN signal received from the CAN signal detector in a volatile memory, may store a current value and a time measurement value of a changed CAN signal in the volatile memory when the CAN signal is changed, may store the current value and the timer measurement value of the CAN signal corresponding to the CAN diagnosed to correspond to non-entry into sleep and a list of controllers that do not enter sleep, in the volatile memory when the CAN sleep diagnosis unit diagnoses non-entry into sleep of the CAN, and may copy the whole data stored in the volatile memory to a non-volatile memory.

Thus, the memory storing determiner may store content of a CAN signal, a time point of storing the CAN signal, a measurement value of a timer, content of controllers that do not enter sleep, or the like in a memory.

For example, data of the volatile memory may be stored as a stack structure in the form of first in last out (FILO).

According to the present disclosure, a non-volatile memory may be used only at a time point when non-sleep state of a CAN occurs, and thus a use rate of a non-volatile memory may be reduced, but a memory may be differently configured and used depending on environments and other purposes of the memory.

Figure 5:
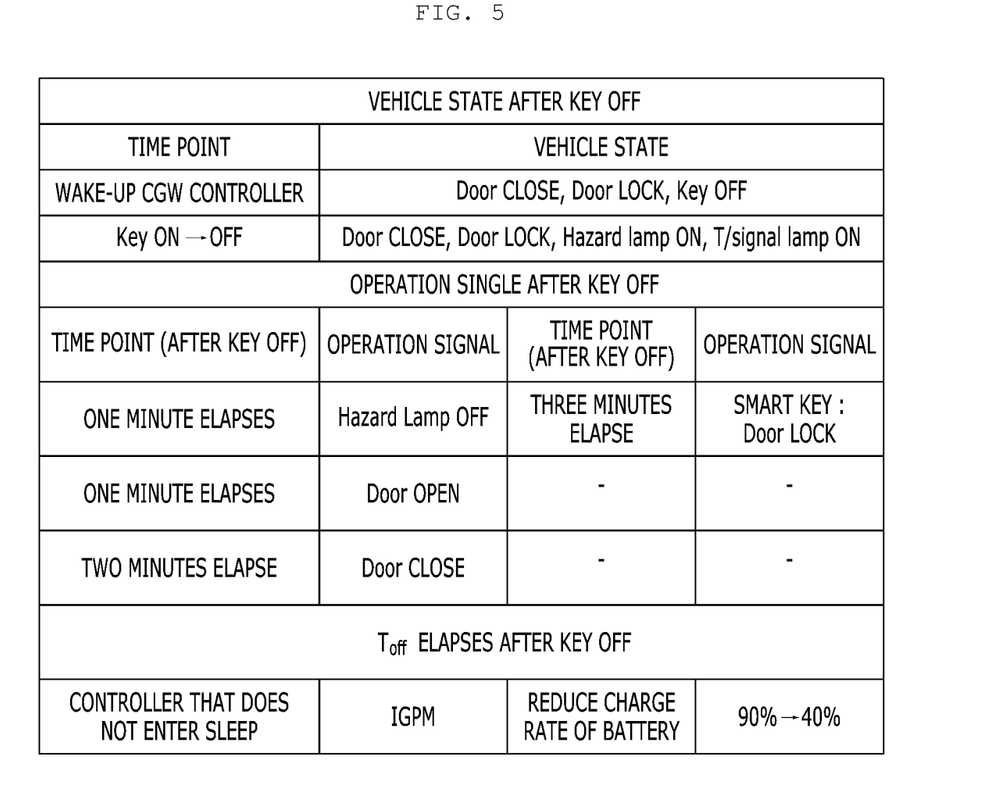
FIG. 5 is a diagram for explaining content of data output to a diagnosis unit.

FIG. 5 is a diagram for explaining content of data output to a diagnosis unit.

As shown in FIG. 5, the diagnosis unit according to the present disclosure may check a history of transmission of a CAN signal corresponding to a CAN that does not enter sleep and a list of controllers that do not enter sleep, stored in the memory of the memory storing determiner, and may track a controller having a problem and a condition in which the problem occurs to analyze the reason for the problem.

For example, as shown in FIG. 5, a vehicle state prior to key off, an operation signal after key off, and content of a list of controllers that do not enter sleep when a predetermined time elapses after key off may be output to a screen of a diagnosis unit.

Figure 6:
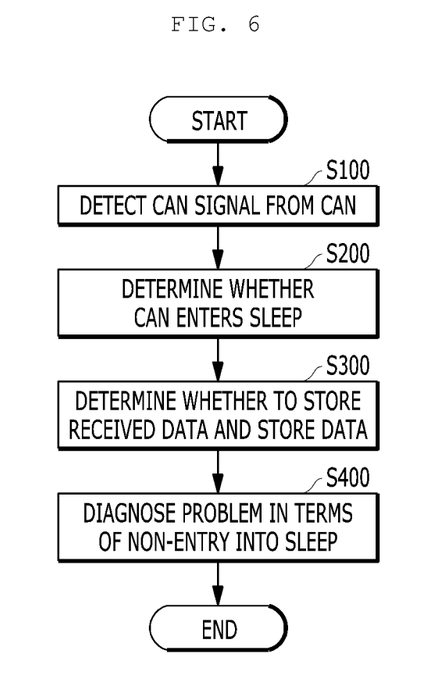
FIGS. 6 and 7 are flowcharts for explaining a method of diagnosing sleep of a CAN according to an embodiment of the present disclosure.
Figure 7:
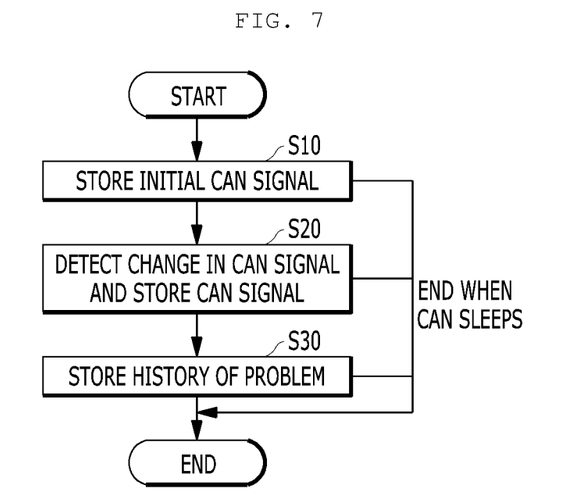

FIGS. 6 and 7 are flowcharts for explaining a method of diagnosing sleep of a CAN according to an embodiment of the present disclosure.

As shown in FIG. 6, according to the present disclosure, a CAN signal may be detected from a CAN that is communication-lined with a plurality of controllers (S100).

Here, according to the present disclosure, the CAN signal may be detected and a monitoring table including a list of N CAN signals may be generated.

According to the present disclosure, whether the CAN enters sleep may be diagnosed (S200).

Here, according to the present disclosure, when the alive time of the CAN is greater than a first predetermined time after vehicle is converted into an off-state from an on-state, non-sleep state of the CAN may be diagnosed.

According to the present disclosure, depending on the cases, when the CAN enters sleep and then is waken-up or repeatedly performs wake-up and sleep after vehicle power is converted into an off-state from an on-state, non-sleep state of the CAN may also be diagnosed at a time point at which a total alive maintenance time of the CAN is greater than a second predetermined time while a value of a wake-up counter is equal to or greater than a specific number.

Then, according to the present disclosure, whether data corresponding to a CAN signal may be determined depending on whether the CAN enters sleep and the data may be stored (S300).

Here, according to the present disclosure, a current value and a timer measurement value of an initial CAN signal may be stored in a first memory, when the initial CAN signal is changed, the current value and the timer measurement value of the changed CAN signal may be stored in the first memory, and when non-entry into sleep of the CAN is diagnosed, the current value and the timer measurement value of the CAN signal corresponding to the CAN network diagnosed to correspond to non-entry into sleep and a list of controllers that do not enter sleep may be stored in the first memory and the whole data stored in the first memory may be copied to the second memory.

Then, according to the present disclosure, the data stored in the memory may be checked and non-sleep state of the CAN may be diagnosed (S400).

Here, according to the present disclosure, a history of transmission of a CAN signal corresponding to a CAN that does not enter sleep and a list of controllers that do not enter sleep, stored in the memory, may be checked, and a controller having a problem and a condition in which the problem occurs may be tracked to analyze the reason for the problem.

FIG. 7 is a flowchart for explaining a memory storing determination method of a memory storing determiner including first and second memories.

As shown in FIG. 7, the memory storing determiner may store data corresponding to an initial CAN signal from a CAN that connects a plurality of controllers in the first memory (S10).

Here, when a CAN controller is waken up from a sleep state or vehicle power is converted into an off-state from an on-state, the memory storing determiner may perform an operation of storing data.

The memory storing determiner may check whether the initial CAN signal is changed (S20).

Then, when the initial CAN signal is changed, the memory storing determiner may store data corresponding to the changed CAN signal in the first memory (S30).

Then, when diagnosing that a CAN does not enter sleep, the memory storing determiner may store data of the CAN signal corresponding to the CAN network that does not enter sleep in the first memory (S40).

The memory storing determiner may copy the data of the CAN signal corresponding to the CAN that does not enter sleep, stored in the first memory, to the second memory (S50).

According to present disclosure, a computer-readable recording medium having recorded thereon a program for executing a method of diagnosing sleep of a CAN of a CAN sleep diagnosis apparatus for a vehicle may perform procedures provided in the method of diagnosing sleep of a CAN of the CAN sleep diagnosis apparatus for a vehicle.

A vehicle according to an embodiment of the present disclosure may include a plurality of controllers and a CAN sleep diagnosis apparatus configured to diagnose non-sleep state of the CAN by monitoring a CAN signal from a CAN that connects the controllers, wherein the CAN sleep diagnosis apparatus includes a CAN signal detector configured to detect the CAN signal from the CAN that connects the plurality of controllers, a CAN sleep diagnosis unit configured to diagnose whether the CAN enters sleep, a memory storing determiner configured to determine whether to store data received from the CAN signal detector and the CAN sleep diagnosis unit depending on the CAN enters sleep and to store the data in a memory, and a diagnosis unit configured to check the data stored in the memory and to diagnose non-sleep state of the CAN.

In the apparatus and method for diagnosing sleep of a CAN for a vehicle related to at least one embodiment of the present disclosure as configured above, non-sleep state of the CAN in a vehicle development stage may be previously overcome by monitoring a CAN signal to diagnose the problem in terms of non-entry into sleep and transmitting a list of controllers that do not enter sleep and a history of transmission of the CAN signal at a corresponding time point to diagnosis equipment.

That is, according to the present disclosure, in the vehicle development stage, occurrence of non-sleep state of the CAN may be diagnosed and the reason therefor may be analyzed by monitoring whether a CAN does not enter sleep and transmitting a list of controllers that do not enter sleep and a history of manipulation of a vehicle at a corresponding time point to diagnosis equipment when the problem occurs.

The present disclosure may propose a further advanced CAN network sleep condition to comprehensively diagnose non-sleep state of the CAN in a general condition in which a vehicle is used, in which case a forced sleep function is not used, thereby ensuring security and stability and simultaneously achieving a previous resolution for pre-diagnosing non-sleep state of the CAN but not a later resolution after the problem occurs.

Thus, according to the present disclosure, a list of controllers at a time point at which non-sleep state of the CAN occurs and a history of manipulation of a vehicle may be checked, and the problem in terms of non-entry into sleep may be diagnosed and the reason for the problem may be analyzed in a vehicle development stage.

According to the present disclosure, in the future, the effect achieved through the present disclosure may be further enhanced in consideration of the fact that related cases increasingly occur along with development of technologies of controllers.

It will be appreciated by persons skilled in the art that that the effects that could be achieved with the present disclosure are not limited to what has been particularly described hereinabove and other advantages of the present disclosure will be more clearly understood from the detailed description.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A controller area network (CAN) sleep diagnosis apparatus for a vehicle, the apparatus comprising:
   a CAN signal detector configured to detect a CAN signal from a CAN that connects a plurality of controllers;
   a CAN sleep diagnosis unit configured to diagnose whether the CAN enters a sleep state;
   a memory unit configured to determine whether to store data received from the CAN signal detector and the CAN sleep diagnosis unit depending on whether the CAN enters the sleep state and to store the data in a memory; and
   a diagnosis unit configured to check the data stored in the memory and to diagnose a non-sleep state of the CAN;
   wherein the CAN signal detector is configured to detect the CAN signal and to generates a monitoring table including a list of N CAN signals; and
   wherein the CAN signal detector is configured to classify the detected CAN signal into an operation signal prior to park, an operation signal during park, and an operation signal after park to generate the monitoring table.

2. The apparatus of claim 1, wherein, when diagnosing whether the CAN enters the sleep state, the CAN sleep diagnosis unit is configured to diagnose the CAN to enter sleep when the CAN sleeps before a time in which the CAN is maintained to be alive becomes greater than a predetermined time after the vehicle is turned off.

3. The apparatus of claim 1, wherein, when diagnosing whether the CAN enters sleep, the CAN sleep diagnosis unit is configured to diagnose that the non-sleep state of the CAN occurs when the CAN is maintained to be alive after a time in which the CAN is maintained to be alive becomes greater than a predetermined time after the vehicle is turned off.

4. The apparatus of claim 1, wherein, when diagnosing whether the CAN enters sleep, when the vehicle is turned off or a CAN controller is woken up and the vehicle is turned off, the CAN sleep diagnosis unit is configured to accumulate and measure a total alive maintenance time of the CAN until driving a timer to convert vehicle power into an on-state from an off-state, and to reset the timer when vehicle power is converted into the on-state from the off-state.

5. The apparatus of claim 1, wherein, when diagnosing whether when diagnosing whether diagnosis of whether the CAN enters sleep, when an alive time of the CAN is greater than a first predetermined time after vehicle power is converted into an off-state from an on-state, the CAN sleep diagnosis unit diagnoses that the non-sleep state of the CAN occurs.

6. The apparatus of claim 5, wherein the CAN sleep diagnosis unit is configured to set a time greater than the longest time of time consumptions of wireless update through an over the air update (OTA) of all controllers installed in the vehicle as the first predetermined time.

7. The apparatus of claim 5, wherein the CAN sleep diagnosis unit is configured to set, as the first predetermined time, a time greater than the longest time of a time consumption of entry into a sleep mode after a sleep condition of each controller installed in the vehicle is satisfied and a time for which the CAN is maintained to be alive due to a function of a controller while the vehicle is parked.

8. The apparatus of claim 1, wherein, when diagnosing whether the CAN enters sleep, the CAN sleep diagnosis unit is configured to diagnose that the non-sleep state of the CAN occurs when a network management message value is alive at a time point at which an alive time of the CAN is greater than a predetermined time after vehicle power is converted into an off-state from an on-state.

9. The apparatus of claim 1, wherein, when diagnosing whether the CAN enters sleep, when the CAN enters sleep and then is woken-up or repeatedly performs wake-up and sleep after vehicle power is converted into an off-state from an on-state, the CAN sleep diagnosis unit is configured to diagnose that the non-sleep state of the CAN occurs at a time point at which a total alive maintenance time of the CAN is greater than a second predetermined time while a value of a wake-up counter is equal to or greater than a specific number.

10. The apparatus of claim 9, wherein the wake-up counter is configured to be started from o as an initial value, to increase a count one by one when the CAN is waken-up after sleeping, and to be initialized with o when vehicle power is converted into the on-state from the off-state.

11. The apparatus of claim 1, wherein the memory unit comprises:
    a first memory configured to store data received from the CAN signal detector and the CAN sleep diagnosis unit;
    a second memory configured to store data corresponding to a CAN to be diagnosed to correspond to non-entry into sleep; and
    a memory control unit configured to store first data in the first memory when receiving the first data from the CAN signal detector, to receive second data corresponding to a CAN diagnosed to correspond to non-entry into sleep when the CAN sleep diagnosis unit diagnoses non-entry into sleep of the CAN and to store the second data in the first memory, and to copy the first and second data stored in the first memory to the second memory.

12. The apparatus of claim 11, wherein the first memory is a volatile memory and wherein the second memory is a non-volatile memory.

13. The apparatus of claim 11, wherein the memory control unit is configured to store a current value and a time measurement value of an initial CAN signal received from the CAN signal detector in the first memory;
    wherein, when the initial CAN signal is changed, the memory control unit is configured to store a current value and a time measurement value of the changed CAN signal in the first memory; and
    wherein, when the CAN sleep diagnosis unit diagnoses non-entry into sleep of the CAN, the memory control unit is configured to store the current value and the time measurement value of the CAN signal corresponding to the CAN diagnosed to correspond to non-entry into sleep and a list of controllers that do not enter sleep, in the first memory, and to copy all data stored in the first memory to the second memory.

14. The apparatus of claim 1, wherein the diagnosis unit is configured to check a history of transmission of a CAN signal corresponding to a CAN that does not enter sleep and a list of controllers that do not enter sleep stored in the memory unit, and to track a controller having a problem and a condition in which the problem occurs to analyze the problem.

15. A controller area network (CAN) sleep diagnosis method of a CAN sleep diagnosis apparatus for a vehicle, the method comprising:
   detecting a CAN signal from a CAN that connects a plurality of controllers, wherein detecting the CAN signal from the CAN comprises generating a monitoring table including a list of N CAN signals, the monitoring table be generated by classifying the detected CAN signal into an operation signal prior to park, an operation signal during park, and an operation signal after park table;
   diagnosing whether the CAN enters a sleep state;
   determining whether to store data corresponding to the CAN signal depending on whether the CAN enters the sleep state;
   storing the data in a memory when it is determined to store the data corresponding to the CAN signal;
   checking the data stored in the memory; and
   diagnosing a non-sleep state of the CAN based on the data stored in the memory.

16. The method of claim 15, wherein storing the data in the memory comprises:
   storing a current value and a timer measurement value of an initial CAN signal in a first memory;
   when the initial CAN signal is changed, storing a current value and a time measurement value of the changed CAN signal in the first memory;
   when diagnosing non-entry into the sleep state of the CAN, storing, in the first memory, the current value and the timer measurement value of the CAN signal corresponding to the CAN diagnosed to correspond to non-entry into sleep and a list of controllers that do not enter sleep; and
   copying all data stored in the first memory to a second memory.

17. The method of claim 15, further comprising diagnosing a problem in terms of non-entry into sleep by checking a history of transmission of a CAN signal corresponding to a CAN that does not enter sleep and a list of controllers that do not enter sleep stored in the memory, and tracking a controller having a problem and a condition in which the problem occurs.

18. A computer-readable recording medium having recorded thereon a program for executing the method of claim 15.

19. A vehicle comprising:
   a plurality of controllers;
   a controller area network (CAN) that connects the plurality of controllers;
   a signal detector configured to detect a CAN signal from the CAN;
   a CAN sleep diagnosis unit configured to diagnose whether the CAN enters a sleep state;
   a memory unit configured to determine whether to store data received from the signal detector and the CAN sleep diagnosis unit depending on whether the CAN enters the sleep state and to store the data in a memory; and
   a diagnosis unit configured to check the data stored in the memory and to diagnose non-sleep state of the CAN;
   wherein the signal detector is configured to detect the CAN signal and to generates a monitoring table including a list of N CAN signals; and
   wherein, the signal detector is configured to classify the detected CAN signal into an operation signal prior to park, an operation signal during park, and an operation signal after park to generate the monitoring table.

20. The vehicle of claim 19, wherein the memory unit comprises:
   a first memory configured to store data received from the signal detector and the CAN sleep diagnosis unit;
   a second memory configured to store data corresponding to a CAN to be diagnosed to correspond to non-entry into sleep; and
   a memory control unit configured to store first data in the first memory when receiving the first data from the signal detector, to receive second data corresponding to a CAN diagnosed to correspond to non-entry into sleep when the CAN sleep diagnosis unit diagnoses non-entry into sleep of the CAN and to store the second data in the first memory, and to copy the first and second data stored in the first memory to the second memory.

* * * * *

UNITED STATES PATENT AND TRADEMARK OFFICE
CERTIFICATE OF CORRECTION

PATENT NO. : 11,418,363 B2  
APPLICATION NO. : 16/834304  
DATED : August 16, 2022  
INVENTOR(S) : Ji Hyeon Kim et al.

Page 1 of 1

It is certified that error appears in the above-identified patent and that said Letters Patent is hereby corrected as shown below:

In the Claims

Claim 10, Column 12, Line 34; delete "from o as an initial value," and insert --from 0 as an initial value,--.

Claim 10, Column 12, Line 36; delete "with o when vehicle" and insert --with 0 when vehicle--.

Signed and Sealed this  
Fourth Day of October, 2022

Katherine Kelly Vidal  
*Director of the United States Patent and Trademark Office*